(12) United States Patent
Polotskaya et al.

(10) Patent No.: US 8,210,361 B2
(45) Date of Patent: Jul. 3, 2012

(54) THERMALLY, HEAT AND CHEMICALLY RESISTANT ULTRAFILTRATION POLYIMIDE MEMBRANE AND METHOD FOR ITS PRODUCTION

(76) Inventors: Galina A. Polotskaya, St.-Petersburg (RU); Tamara K. Meleshko, St.-Petersburg (RU); Alexandr E. Polotsky, St.-Peterburg (RU); Andrey N. Cherkasov, St.-Petersburg (RU)

( * ) Notice: Subject to any disclaimer, the term of this patent is extended or adjusted under 35 U.S.C. 154(b) by 113 days.

(21) Appl. No.: 11/856,951

(22) Filed: Sep. 18, 2007

(65) Prior Publication Data

US 2009/0107908 A1 Apr. 30, 2009

(51) Int. Cl.
*B01D 39/14* (2006.01)
*B01D 39/00* (2006.01)

(52) U.S. Cl. .......... 210/500.39; 427/244; 427/246; 210/500.21; 210/650

(58) Field of Classification Search ........ 210/500.39, 210/560, 652, 653, 500.38, 500.21; 427/243–246
See application file for complete search history.

(56) References Cited

U.S. PATENT DOCUMENTS

| 4,113,628 | A | | 9/1978 | Alegranti |
| 4,378,324 | A | * | 3/1983 | Makino et al. .......... 264/41 |
| 4,963,303 | A | | 10/1990 | Anderson |
| 6,180,008 | B1 | | 1/2001 | White |
| 6,217,996 | B1 | * | 4/2001 | Yamamoto et al. .......... 428/220 |
| 6,790,263 | B1 | * | 9/2004 | Ding et al. .......... 96/13 |

FOREIGN PATENT DOCUMENTS

| EP | 0753336 | 1/1997 |
| GB | 1435151 | 5/1976 |

OTHER PUBLICATIONS

Polotskaya et al., Gas transport properties and structural order of poly(4,4'-oxydiphenylene piromelliteimide) in composite membranes, 1998, Elsevier, Separation and Purification Technology 14, p. 13-18.*
Polotsky et al., Chemically and thermally resistant polyimide ultrafiltration membranes prepared from polyamic acid, 2006, Elsevier, Desalination 200, p. 341-342.*
"Benzotriazole," available at http://chemicalland21.com/specialtychem/finechem/BENZOTRIAZOLE.htm.

* cited by examiner

*Primary Examiner* — Tony G Soohoo
*Assistant Examiner* — David C Mellon
(74) *Attorney, Agent, or Firm* — Michelle P. Nguyen; John T. Lucas

(57) ABSTRACT

A thermally, heat and chemically stable polyimide asymmetric ultrafiltration membrane, is a porous film or a hollow fiber, having an anisotropic structure a selective surface layer and a substrate, wherein the selective ultraporous surface layer has size of pores 70-800 Å with thickness 0.1-10 mcm and is composed of insoluble rigid-chain aromatic (co)polyimide based on dianhydride of aromatic tetracarbonic acid and aromatic diamine and located on the microporous substrate with thickness 50-250 mcm, and the membrane has water permeability $Q=(2-500) \cdot 10^{-4}$ cm/sec atm and nominal molecular weight cutoff $M_L=(5-500) \cdot 10^3$ g/mol, and method for producing an ultrafiltration membrane as disclosed.

12 Claims, No Drawings

THERMALLY, HEAT AND CHEMICALLY RESISTANT ULTRAFILTRATION POLYIMIDE MEMBRANE AND METHOD FOR ITS PRODUCTION

CROSS-REFERENCE TO A RELATED APPLICATION

The invention described and claimed hereinbelow is also described in Russian Patent Application RU 2006133560 filed on Sep. 19, 2006. This Russian Patent Application, whose subject matter is incorporated herein by reference, provides the basis for a claim of priority of invention under 35 U.S.C. 119(a)-(d).

FIELD OF THE INVENTION

The invention relates to thermally, heat and chemically stable ultrafiltration membranes from insoluble rigid-chain polyimides particularly useful, for example, in high temperature filtration in high temperature membrane reactors.

BACKGROUND OF THE INVENTION

The process of ultrafiltration includes separation of solutions in colloidal systems by means of semi-permeable (ultrafiltration) membranes in special apparatuses under pressure 0.1-0.8 MPa (BEC. M: Great Russian Encyclopedia 1997, P 1249). Ultrafiltration membranes are characterized by a certain level of values of water permeability $Q=(2-500)\cdot 10^{-4}$ cm/sec atm and nominal molecular weight cut-off $M_L=(5-500)\cdot 10^3$ g/mol.

Thermal stability of a membrane is determined by the temperature of the beginning of destruction (loss of mass) of the polymer from which it is made.

Heat stability of the membrane is determined by a temperature of softening of the polymer from which it is made.

Non-thermostable polymeric ultrafiltration ultraporous membranes, among which there are chemically stable ones, are known and are used for purification of vaccines, blood, in the food industry, for manufacture of juices, dairy products, and for purification of sewage water. (Mulder. M. Introduction into membrane technology. M. Mir 1999. page 513; Dubiaga V. P., Prepechkin L. B., Katalevsky E. E. Polymeric Membranes. M. Khimia, 1981, page 222). For ultrafiltration, asymmetric membranes are mainly used. Known polymeric asymmetric ultrafiltration membranes, however, are limited in their use. They can not be used in aggressive conditions: at temperatures above 200° C., in aggressive media, and/or in organic solvents.

Ultrafiltration membranes are known based on soluble polyimides, since the process of their manufacture allows one to avoid the stage of imidization.

Ultrafiltration polyimide microporous membrane and method of its manufacture from soluble aromatic polyimide are known (U.S. Pat. No. 4,963,303, issued Oct. 16, 1990). For obtaining the membrane, a 14-22% forming solution is used in chlorine-containing or amide solvents of polyimide XU-218 (also known as Matrimid 5218), which contains 6-20% of poreformer caprolactam. A thin layer of the forming solution is cast on a fabric substrate and immersed into a deposition bath with water. After washing out with water, the membrane is ready to use in an apparatus for deparafinization at temperatures 100-200° C., since the membrane is thermally stable to the same degree as the initial polyimide.

U.S. Pat. No. 6,180,008, issued Jan. 30, 2001, discloses a polyimide small-pore hyperfiltration membrane from Matrimid 5218 or Lenzing P 84. For improving its service characteristics, when compared with the one described above, it includes an additional thermal treatment of membrane at 150° C., with a preliminary filling of pores with technical oil to prevent sticking.

The main disadvantage of the known membranes is that they are destroyed in solvents, in which the used polyimides are dissolved (Matrimid 5218 or Lenzing P 84). Any membrane from soluble polyimide has this disadvantage.

Ultrafiltration membranes based on soluble polyimides have thermal and heat stability, which allows one to use them at temperatures of not more than 200° C. This can be explained by the fact that the soluble polyimides contain in their main chain hinged bridge groups and/or volume groups which, as well known, provides solubility, but at the same time cause significant reduction of the level of thermal and heat stability of the polymer when compared with rigid-chain polyimides.

In other words, all ultrafiltration micro- or small-pores membranes from soluble polyimides are not completely thermally, heat and chemically stable.

A process of obtaining insoluble ultrafiltration polyimide membranes is significantly more difficult. They can not be prepared only based on rigid-chain polyimides, for example, polypyromellitimides. The forming of membranes is not possible from finished polyimide, since rigid-chain polyimides are not soluble and meltable, and it is performed by means of a forming solution of prepolymer.

A limited number of inventions are known, which are connected with an attempt to obtain ultrafiltration membranes from rigid-chain polyimides.

Japanese patent application no. 61-53086, published on Nov. 15, 1986, describes a method of obtaining a polyimide membrane based on dianhydride of 3,3',4,4'-diphenyl tetra carbonic acid and 4,4'-diaminodiphenyl ether. The characteristics of ultrafiltration in the patent are not presented. In the known method there is a problem of preserving the porous structure obtained on the stage of deposition. During drying and subsequent thermal treatment, collapse of pores takes places.

A method of obtaining semipermeable membranes from aromatic polyimide is known based on dianhydride of 3,3',4,4'diphenyl tetra carbonic acid and 4,4'-diaminodiphenyl ether (U.S. Pat. No. 4,378,324, published on Mar. 29, 1983). The disadvantage of this method is the use of a toxic solvent. The main application of the known membranes is gas separation, however, they can not be used for desalination of water solutions. Characteristics of ultrafiltration are not presented in the patent.

The European patent no. 0753336, published on Jan. 15, 1997, describes a polyimide membrane based on a cross-linked copolymer, which is obtained from pyromellite dianhydride, dianhydride of 3,4,4-benzophenone tetra carbonic acid and 4,4-oxydianiline. Obtaining of cross-linking the process of thermal imidization at a temperature $\geqq 250°$ C. allows one probably to fix the porous structure. However, the known method, due to impossibility of control of the process of cross-linking, does not allow one to obtain membranes with a required level of reproductability of porous structure and properties of membranes.

In the technologies described in Great Britain patent no. 1,435,151, published May 12, 1976, and U.S. Pat. No. 4,113, 628, published Sep. 12, 1976, the process of deposition and imidization are combined, with the use of a deposition path of a solution of imidizing mixture of acetic anhydride and triethylamine in benzole (chemical imidization). The main disadvantage of this method is the use for deposition and imidization membranes with high volumes of aggressive media of imidizing mixture, and after performing final thermal treatment of the surface layer, the membrane becomes too dense for ultrafiltration.

Other examples of known polyimide membranes are described in U.S. Pat. No. 6,716,270, published on Apr. 6, 2004. However, characteristics of ultrafiltration in the patent are not presented.

Therefore, there is a pressing need for thermally, heat and chemically stable ultrafiltration polyimide membranes suitable, in particular, for ultrafiltration.

SUMMARY OF THE INVENTION

Accordingly, it is an object of the present invention to provide thermally, heat, and chemically stable asymmetric ultrafiltration polyimide membranes. Another objective is a method of producing thermally, heat, and chemically stable asymmetric ultrafiltration polyimide membranes.

The thermally, heat and chemically stable asymmetric ultrafiltration polyimide membrane is a porous film or a hollow fiber, which is characterized by anisotropic structure and includes a selective surface layer and a substrate, wherein the selective ultraporous surface layer has pore sizes of 70-800 Å with thickness 0.1-10 mcm and is composed of insoluble rigid-chain aromatic (co)polyimide based on dianhydride of aromatic tetracarbonic acid and aromatic diamine and located on a microporous substrate with thickness 50-250 mcm; and the membrane is characterized by water permeability $Q=(2-500)\cdot 10^{-4}$ cm/sec atm and nominal molecular weight cutoff $M_L=(5-500)\cdot 10^3$ g/mol.

The present invention is also characterized by a process for producing thermally, heat and chemically stable asymmetric ultrafiltration polyimide membranes by preparing a 10-15% forming solution of (co)-polyimideacid based on dianhydride of aromatic tetracarbonic acid and aromatic diamine in amide solution. In the prepared solution of (co)polyamidoacid, a catalyst of thermal imidization-azole is introduced in the of quantity of 1.5-2.5 mol per 1 monomeric link of (co)polyamidoacid, and then successively with mixing, reagents are introduced: tertiary amine and anhydride of lower monocarbonic aliphatic and aromatic acids in the quantity of 0.4-1.0 mol per 1 monomeric link of (co)polyamidoacid, and a partial controlled chemical imidization of (co)polyamidoacid is formed at 10-40%, the solution of produced (co)polyimidoamidoacid is mixed and degassed, and after this a wet formation of the membranes is formed by casting of a layer of forming solution of polyimidoamidoacid by a die with a regulated gap on a forming plate, the plate is immersed into a deposition bath with a coolant-water or aqueous solution containing up to 60% of aliphatic one-atom alcohol, the formed membrane is retained in at least 20-60% solution of high boiling technical oil in organic solvent for filling pores of the membrane with oil and the membrane is dried and heated to 160-200° C. with the speed of temperature elevation 10°/min for obtaining complete imidization of (co)-polyimidoamidoacid.

DESCRIPTION OF THE PREFERRED EMBODIMENTS

The thermally, heat and chemically stable polyimide asymmetric ultrafiltration membrane, is a porous film or a hollow fiber which is characterized by anisotropic structure and includes a selective surface layer and a substrate, wherein the selective ultraporous surface layer has pore sizes of 70-800 Å with thickness 0.1-10 mcm and is composed of insoluble rigid-chain aromatic (co)polyimide based on dianhydride of aromatic tetracarbonic acid and aromatic diamine and located on a microporous substrate with thickness 50-250 mcm; and the membrane is characterized by water permeability $Q=(2-500)\cdot 10^{-4}$ cm/sec atm and nominal molecular weight cutoff $M_L=(5-500)\cdot 10^3$ g/mol.

In the membrane, the selective surface layer is composed of (co)polyimide based on dianhydride of aromatic tetracarbonic acid from the group of dianhydride of pyromellitic acid, dianhydride of 3,3',4,4'-diphenyl tetra carbonic acid, dianhydride of 3,3',4,4"-diphenyl oxytetra carbonic acid, dianhydride of 3,3',4,4'-diphenylsulfone tetra carbonic acid, dianhydride of 3,3',4,4'-benzophenone tetra carbonic acid or their mixtures and aromatic diamine from the group of: 4,4'-diaminodiphenyl ether, 4,4'-diaminodiphenylsulfone, 4,4'-diaminodiphenylmethane, n-phenyldiamine, m-phenyldiamine, benzidine, 2,4-diaminopyrimidine or their mixtures.

The substrate is composed of the same polymer as the surface layer, or composed of microporous metals or ceramics.

The combination of important features of the membrane leads to the creation of a thermally, heat- and chemically stable polyimide membrane, which is capable of ultrafiltration, due to the claimed combination of structure of polymer and parameters of membrane.

The membrane is distinguished from the known membrane-prototype by several important features.

First, the membrane is composed of pure polyimides without admixture of salt of polyimidoamidoacid as in previously known membranes. Secondly, the size of its pores and porosity is different from the previously known membranes, which makes it an ultrafiltration membrane. Most important is that the membrane of the invention has concrete measurable values of water permeability Q and nominal molecular weight cutoff $M_L$, which are characteristic for ultrafiltration membranes and are absent in the previously known membranes.

An embodiment of the present invention is also characterized by a method of obtaining a thermally, heat and chemically stable asymmetric ultrafiltration polyimide membrane, wherein a 10-15% forming solution of (co)polyimideacid is prepared based on dianhydride of aromatic tetracarbonic acid and aromatic diamine in amide solution. In the prepared solution of (co)polyamidoacid, a catalyst of thermal imidization-azole- is introduced in the of quantity of 1.5-2.5 mol per 1 monomeric link of (co)polyamidoacid, and then successively with mixing, reagents are introduced: tertiary amine and anhydride of lower monocarbonic aliphatic and aromatic acids in the quantity of 0.4-1.0 mol per 1 monomeric link of (co)polyamidoacid, and during this a partial controlled chemical imidization of (co)polyamidoacid is formed at 10-40%, the solution of produced (co)polyimidoamidoacid is mixed and degassed, and after this a wet formation of the membranes is formed by casting of a layer of forming solution of polyimidoamidoacid by a die with a regulated gap on a forming plate, the plate is immersed into a deposition bath with a coolant-water or aqueous solution containing up to 60% of aliphatic one-atom alcohol, the formed membrane is retained in at least 20-60% solution of high boiling technical oil in organic solvent for filling pores of the membrane with oil and the membrane is dried and heated to 160-200° C. with the speed of temperature elevation 10°/min for obtaining complete imidization of (co)polyimidoamidoacid.

(Co)polyamidoacid is used based on dianhydride of aromatic tetracarbonic acid from the group of dianhydride of pyromellitic acid, dianhydride of 3,3',4,4'-diphenyl tetra carbonic acid, dianhydride of 3,3',4,4'-diphenyl oxytetra carbonic acid, dianhydride of 3,3',4,4' of diphenylsulfone tetra carbonic acid, dianhydride of 3,3',4,4'-benzophenone tetra carbonic acid or their mixtures, and aromatic diamine from the group of 4,4'-diaminodiphenyl ether, 4,4', diaminodiphenylsulfone, 4,4'-diaminodiphenylmethane, n-phenyldiamine, m-phenyldiamine, benzidine, 2,4-diaminopyrimidine, or their mixtures.

The amide solvent is selected from the group of N,N'-dimethylformamide, N,N'-dimethylacetamide, N-methyl-2-pyrrolidone.

As the azole, a substance from the group of benzimidazole, imidazole, 1,2,3-benzotriazole is used.

As the tertiary amine, a nitrogen-containing heterocycle from the group of pyridine, 2-picoline, 3-picoline, 2,4-lutidine, hinoline, or aliphatic amine-triethylamine and tributhylamine is used.

As the anhydride of lower monocarbonic aliphatic or aromatic acids, a composition from the group of anhydride of acetic acid, anhydride of propionic acid, anhydride of benzoic acid is used.

As the aliphatic one-atom alcohol in a depositor, a composition from the group of ethyl alcohol, isopropyl alcohol, butyl alcohol is used.

As the organic solvent in the solution of oil, a solvent from the group of hexane, petroleum ether, chlorofluorohydrocarbons is used.

As the high boiling technical oil, high boiling polymethylsiloxane oil from the group of PMS-50, PMS-100, PMS-400, PMS-700 is used.

The forming plate that is used is a glass plate, from which the formed membrane composed of a polymeric selective layer and a polymeric substrate of the same polymer is separated itself, before treating with the solution of oil.

The forming solution of polyimidoamidoacid is cast on the forming plate as a layer having a thickness 0.1-0.5 mm by means of a die with a regulatable gap.

As the forming plate, a plate from a microporous ceramics with thickness 50-250 mcm which simultaneously can be a substrate of the membrane can be used.

The initial polyamidoacid is synthesized from dianhydride of tetracarbonic acid and aromatic diamine in amide solvent in accordance with known methods, or a commercial polyamidoacid is used.

The combination of the important features of the method leads to an increase of efficiency of technology for obtaining thermally, heat and chemically stable polyimide ultraporous membranes that lead to obtaining the targeted ultrafiltration membranes. This effect is reached by means of the invention developed by the inventors, with the combination of conditions, sequence and parameters of the operation, providing preservation of the formed pores. As a result of realization of the invention, membranes are obtained from accessible, commercially produced polyamidoacids, which is important from an economical and ecological point of view. It was possible to reach stability of forming solution during 10-15 days at room temperature and 2-3 months at 4-6° C., which is a serious technological problem during manufacture of polyimides and articles from them. The invention method is less energy consuming, since the final imidization can be obtained at 150-200° C. instead of 300° C.

The invention has the following important features: the invention relates only to obtaining of membranes based on completely insoluble polyimides; the forming of asymmetric ultraporous membranes is formed on the stage of soluble prepolymer. Prepolymer is a polyimidoamido acid; the degree of partial imidization of polyamidoacids is up to 40%.

For obtaining prepolymer in the method, initially azoles are introduced into the solution of polyamidoacid in amid solvents in the quantity, which is close to stoichiometric quantity in regard to the amidoacid groups of polyamidoacid. Then, for performing controlled partial imidization of the concentrated polymeric solution, agents of chemical imidization are introduced. In the invention, the operation of filling of pores with oil is used for their preservation during thermal imidization. The conditions of the final thermal treatment of the membrane are such that 100% imidization of polyimidoamidoacid is guaranteed.

Chemical imidization is known and conditions of its performance (M. I. Bessonov, M. M. Koton, V. V. Kudryavtsev, N. A. Layus. Polyimides-Class of Thermally Stable Polymers, L. Nauka, 1988, p 61). In the inventive method, conditions are developed for combining of controlled partial chemical imidization of polyamidoacid in solution and catalytical thermal imidization (additional imidization) of o-carboxyamide prepolymer in a solid phase (in formed membrane). The polymer during the partial imidization in a solution with a concentration 10-15 mass % in amide solvents does not lose its solubility. Partially imidized polyamidoacid (to 40%) forms in amide solvents a homogenous transparent solution. At the same time, due to introduction into polyamidoacid up to 40% of imidized links, hydrophilicity of the polymer is significantly reduced, which positively influences the process of its coagulation in water or in water solutions of alcohol. It was determined in specially conducted experiments that with the use in this scheme of azoles, the coagulation of obtained prepolymer in water and in water solutions in alcohol (ethanol, methanol, etc.) leads to obtaining of impermeable membrane. For the prepolymer obtained by the inventive method, a suitable depositor was selected, acetone, and asymmetric membranes of prepolymer with good permeability were obtained with its use. However, these membranes, after a final thermal treatment, became irreversibly impermeable.

With the inventive method, first azoles are introduced in a solution of surface active components, and then under the action of imidizing mixture (preferably a mixture of acetic anhydride in pyridine), a controlled partial chemical imidization is performed. Destruction of the polymer virtually does not take place, in such conditions.

The inventive method of preservation of pores in the formed membrane of the prepolymer and due to this, the preservation of permeability in the polyimide membrane is favored by a relatively low temperature of thermal imidization (150-200° C.), which is catalyzed by azoles introduced in the prepolymer, and also by impregnation of prepolymer membrane with boiling oils, which precedes the thermal treatment.

The important features of the present invention further make it possible, during production of the membrane, to select conditions for preservation of pores that are necessary for ultrafiltration. Furthermore, an objective of stabilization of forming solution was achieved, which is very pressing during industrial production of membranes from the polyimides.

The following examples of realization of the present invention are presented hereinbelow but should not be construed as limiting.

Reagents

Dianhydrides of aromatic tetracarbonic acids aromatic diamines were used which are commercially available or synthesized in accordance with the known methods (M. I. Bessonov, M. M. Koton, V. V. Kudriavtsev, L. A. Layus. Polyimides-Class of Thermally Stable Polymers L. Nauka, 1983, page 308). Also, commercially available polyamidoacids were used.

Reagents for chemical imidilization, solvents, catalyst of thermal imidization were used.

Commercially available alcohols for deposition bath were used.

Procedures

Membranes were investigated for water permeability and organic liquids permeability with different values of viscosity. Water permeability was $(2-5) \cdot 10^4$ cm/sec atm. Analysis of the structure of obtained ultrafiltration membranes was performed in accordance with the data of their calibration with the use of model mixture of albumines, which are different in regard to a range of molecular masses (Cherkasov A. N.) Express-Analysis of Structure of Ultrafiltration Membranes in the Process of Their Development Membranes. 2002. No. 14. P. 3-17). Dispersion of the cut-off curve, which characterizes the distribution of effective sizes of pores was 1.0-1.5, the value of nominal molecular weight cut-off was (5-500) $10^3$ g/mol.

Morphology of membranes was evaluated by scanning electron microscopy. A total thickness of the membranes was measured by a micrometers; thickness of selective layer of membrane was determined in accordance with data of scanning electron microscopy or in accordance with calibration data with the use of the method of A. N. Cherkasov.

Thermal stability was determined based on the change of weight of a sample membrane during its heating with a given speed by means of thermogravimetric analysis.

Chemical stability of membranes was investigated during keeping of the membranes for 10 days at room temperature in various liquids, including solvents of amide type, with a subsequent control of their permeability. None of investigated membranes showed changes in structure and permeability after such tests.

Equipment

Forming stands for producing membranes and hollow fibers.

Stands with ultrafiltration cells for determination of permeability of membranes. Micrometer of type MK. A liquid chromotograph of high pressure LKB. Scanning electron microscope JSM-35 Jeol-Japan. Modified derivatograph "C" of the company MOM.

Example 1

Thermally, heat and chemically stable asymmetric ultrafiltration polyimide membrane, represent a porous film, which is characterized by anisotropic structure and includes a selective surface layer and a substrate, wherein the selective ultraporous surface layer with pore size of 70 Å and thickness 0.1 mcm is composed of insoluble rigid-chain aromatic polyimide based on dianhydride of pyromellitic acid and 4,4'-diaminodiphenyl ether and located on a microporous substrate from the same polymer with thickness 150 mcm; the membrane is characterized by water permeability $0=20 \cdot 10^{-4}$ cm/sec atm and the nominal molecular weight cut-off $M_L = 5 \cdot 10^3$ g/mol.

The membrane can be used at temperatures above 200° C. up to 400° C., it is stable to the action of concentrated acids, organic solvents.

Method of Manufacture:

A viscous forming solution is prepared in N-methyl-2-pyrrolidone containing 12% polyamidoacid (1.94 g), 6.7% (1.09 g) of catalyst of thermal imidization-benzimidazole is introduced 2 mol per 1 monomeric link. Then, in the solution, there are introduced agents of chemical imidization; pyridine and anhydride of acetic acid with their mol ratio 1/1. The agents of chemical imidization are introduced in the quantity 0.6 mol per 1 monomeric link of polyamidoacid, which provides performance of partial imidization to 30%. The solution is thoroughly mixed and degassed. The prepared forming solution which contains complexes of polyimidoamidoacid with benzimidazole is applied on the glass plate 20×20 $cm^2$ by means of a die having a gap 0.3 mm, with a speed of movement of the die along the glass 2 cm/sec. The glass with a uniform layer of polymeric solution is transferred into a deposition bath, which is filled with 40% aqueous solution of ethanol. After separation of the polymeric membrane from the glass, the content of the deposition bath is discharged, the glass is removed, and the bath with the membrane is filled with 1 l of pure depositor. The membrane is a kept in the deposition bath for 2 hours. The formed membrane is taken from the deposition bath and washed out in ethanol, and then in hexane and introduced into a bath with 50% solution of oil PMS-100 in hexane, and then held for 20 hours. Then the membrane is dried for 7 hours at temperature 40° C., introduced into a thermostat and subjected to stepped thermal treatment to 150° with the speed of temperature elevation 10°/min for obtaining a complete imidization of polyimidoamidoacid. Then from the obtained membrane, samples are cut out for measurements of permeability and for calibration, with a diameter of 25 and 37 mm correspondingly.

Example 2

Thermally, heat and chemically stable polyimide ultrafiltration membrane, which is analogous to the membrane described in Example 1 with a selective ultra porous surface layer with size of the pores 800 Å and thickness 10 mcm, and substrate with a thickness 250 mcm. The membranes is characterized water by permeability $Q=300 \cdot 10^{-4}$ cm/sec atm and nominal molecular weight cut $M_L = 400 \cdot 10^3$ g/mol.

The membrane can be used at temperatures above 200° C. up to 400° C., it is stable to action of concentrated acids, and organic solvents.

The method of its making is analogous to the method described in Example 1, with the exception of the use of 10% solution of polyamidoacid in N-methyl-2-pyrrolidone, introduction of benzimidazole with 2.5 mol per 1 monomeric link and reagents for chemical imidization in quantity of 1 mol per 1 monomeric link of polyamidoacid.

Example 3

Thermally, heat and chemically stable polyimide ultrafiltration membranes, analogous to the membrane described in Example 1, the substrate from microporous titanium with thickness of 50 mcm.

The membrane is characterized by water permeability $Q=80 \cdot 10^{-4}$ cm/sec atm and nominal molecular weight cut-off $M_L = 140 \cdot 10^3$ 2/mol.

The membrane can be used at temperatures above 200° up to 400° C., it is stable to action of concentrated acids, organic solvents.

The method of production is analogous to the method described in Example 2, with the exception that the membrane is not separated from the forming plate, which in this case forms a component of a substrate.

Example 4

Thermally, heat and chemically stable ultrafiltration polyimide membrane, analogous to membrane described in Example 1, with a substrate of a microporous ceramics with thickness 20 mcm. The membrane is characterized by water permeability for water Q=210·10$^{-4}$ cm/sec atm and nominal molecular weight cut-off M$_L$=275·10$^3$ g/mol.

The membrane can be used at temperatures above 200° C. up to 400° C., it is stable to the action of concentrated acids, organic solvents.

The method of its production is analogous to the method described in Example 3.

Example 5

Thermally, heat, and chemically stable polyimide ultrafiltration membranes, analogous to membrane described in Example 1, from insoluble rigid-chain aromatic copolyimide based on dianhydride of pyromellitic acid and a mixture with ratio 1.1 of 4,4'-diaminodiphenyl ether and n-phenyldiamine with a selective ultraporous surface layer with size of pores 200 Å and thickness 4 mcm, and substrate with thickness 120 mcm.

The membrane is characterized by water permeability Q=(2–500)·10$^{-4}$ cm/sec atm and nominal molecular weight cut-off M$_L$=(5·500)·10$^3$ g/mol.

The membrane can be used at temperatures above 200° C. up to 400° C., it is stable to action of concentrated acids, organic solvents.

Example 6

Thermally, heat and chemically stable polyimide ultrafiltration membrane, analogous to the membrane described in Example 1, from insoluble rigid-chain aromatic copolyimide based on a mixture with ratio 1:1 dianhydride of pyromellitic acid and dianhydride 3,3',4,4'-diphenyl oxytetra carbonic acid and 4,4'-diaminodiphenyl ether with selective ultraporous surface layer with pore size 300 Å and thickness 5 mcm and substrate with thickness 140 mcm.

The membrane is characterized by water permeability Q=180·10$^{-4}$ cm/sec atm and nominal molecular weight cut-off M$_L$=260·10$^3$ g/mol.

The membrane can be used at temperatures above 200° C. up to 400° C., its is stable to the action of concentrated acids, organic solvents.

Example 7

Thermally, heat and chemically stabile polyimide ultrafiltration membrane, analogous to membrane described in Example 1, from insoluble rigid-chain aromatic polyimide based on dianhydride of 3,3',4,4'-diphenyl tetra carbonic acid and 4,4'-diaminodiphenylsulfone with selective ultraporous surface layer with size of pores 500 Å, a thickness mcm, and substrate with thickness 150 mcm.

The membrane is characterized by water permeability Q=250·10$^{-4}$ cm/sec atm and nominal molecular weight cut-off M$_L$=330×10$^3$ g/mol.

The membrane can be used at temperatures above 200° C. up to 400° C., it is stable to action of concentrated acids, organic solvents.

Example 8

Thermally, heat and chemically stable polyimide ultrafiltration membrane, analogous to membrane described in Example 1, from insoluble rigid chain aromatic polyimide based on dianhydride of 3,3',4,4'diphenylsulfone tetra carbonic acid and 4,4'-diaminodiphenylmethane with a selective ultraporous surface layer with size of pores 120 Å and thickness 5 mcm, and a substrate with thickness 200 mcm.

The membrane is characterized by water permeability Q=95·10$^{-4}$ cm/sec atm and nominal molecular weight cut-off M$_L$=120×10$^3$ g/mol.

The membrane can be used at temperatures above 200° C. up to 400° C., it is stable to action of concentrated acids, organic solvents.

Example 9

Thermally, heat and chemically stable polyimide ultrafiltration membrane, analogous to membrane described in Example 1, from insoluble rigid-chain aromatic polyimide based on dianhydride of 3,3',4,4'benzophenone tetra carbonic acid and m-phenyldiamine with selective ultraporous surface layer with pore size 300 Å, thickness 6 mcm, and substrate with thickness 150 mcm.

The membrane is characterized by water permeability Q=120·10$^{-4}$ cm/sec atm and nominal molecular weight cut-off M$_L$=150×10$^3$ g/mol.

The membrane can be used at temperatures above 200° C. up to 400° C., it is stable to action of concentrated acids, organic solvents.

Example 10

Thermally, heat and chemically stable polyimide ultrafiltration membrane, analogous to the membrane described in Example 1, from insoluble rigid-chain aromatic polyimide based on dianhydride of 3,3',4,4'-benzophenone tetra carbonic acid and benzidine with selective ultraporous surface layer with a size of pores 400 Å and a thickness 8 mcm, and substrate with thickness 150 mcm.

The membrane is characterized by water permeability Q=160·10$^{-4}$ cm/sec atm and nominal molecular weight cut-off M$_L$=200·10$^3$ g/mol.

The membrane can be used at temperatures above 200° C. up to 400° C., it is stable to action of concentrated basis, organic solvents.

Example 11

Thermally, heat and chemically stable polyimide ultrafiltration membrane, analogous to the membrane described in Example 1, from insoluble rigid-chain aromatic polyimide based on dianhydride of 3,3',4,4'-benzophenone tetra carbonic acid and 2,4-diaminopyrimidine with selective ultraporous surface layer with the size of pores 300 Å and thickness 5 mcm, and substrate with thickness 130 mcm.

The membranes is characterized by water permeability Q=180·10$^{-4}$ cm/sec atm and nominal molecular weight cut M$_L$=220·10$^3$ g/mol.

The membrane can be used at temperatures above 200° C. up to 400° C., it is stable to action of concentrated acids, and organic solvents.

Example 12

Thermally, heat and chemically stable polyimide ultrafiltration membrane, which is analogous to the membrane described in Example 1 from insoluble rigid-chain aromatic polyimide based on dianhydride of pyromellitic acid and n-phenyldiamine with selective ultra porous surface layer with size of the pores 200 Å and thickness 4 mcm, and substrate with thickness 150 mcm.

The membranes is characterized by water permeability Q=80·10$^{-4}$ cm/sec atm and nominal molecular weight cut-off M$_L$=160·10$^3$ g/mol.

Example 13

Thermally, heat and chemically stable polyimide ultrafiltration membrane, which is analogous to the membrane described in Example 1, formed as a hollow fabric.

The membranes is characterized by water permeability $Q=80 \cdot 10^{-4}$ cm/sec atm and nominal molecular weight cut-off $M_L=160 \cdot 10^3$ g/mol.

The membrane can be used at temperatures above 200° C. up to 400° C., it is stable to action of concentrated acids, and organic solvents.

Example 14

Thermally, heat and chemically stable polyimide ultrafiltration membrane, which is analogous to the membrane described in Example 2 formed as a hollow fabric. The membranes is characterized by water permeability $Q=320 \cdot 10^{-4}$ cm/sec atm and nominal molecular weight cut-off $M_L=460 \cdot 10^3$ g/mol.

The membrane can be used at temperatures above 200° C. up to 400° C., it is stable to action of concentrated acids, and organic solvents.

Example 15

Thermally, heat and chemically stable polyimide ultrafiltration membrane, which is analogous to the membrane described in Example 1. For its production a solvent N,N'-dimethylformamide is used, catalyst of thermal imidization-imidazole, reagents for chemical imidization-2 picoline and anhydride of propionic acid, as a depositor there is used 60% aqueous solution of isopropyl alcohol, the membrane is impregnated with 20% solution of oil PMS-400 in hexane.

Example 16

Thermally, heat an chemically stable polyimide ultrafiltration membrane, analogous to the membrane described in Example 1. For its production N,N'dimethylacetamide is used as a solvent, 1,2,3-benzotriazole is used as a catalyst of thermal imidization, reagents for chemical imidization-3-picoline and anhydride of benzoin acid, as a depositor-20% solution of butyl, alcohol, the membrane is impregnated with 60% solution of oil PMS-100 in petrol ether.

Example 17

Thermally, heat and chemically stable polyimide ultrafiltration membrane, analogous to the membrane described in Example 1. For its production N,N'-dimethylformamide is used as a solvent, 1,2,3-benzotriazole is used as a catalyst of thermal imidization, reagents for chemical imidization -2,4-lutidine and anhydride of benzoic acid, as a depositor-water, the membrane is impregnated with 40% solution of oil PMS-50 in chloroform.

Example 18

Thermally, heat and chemically stable polyimide ultrafiltration membrane, analogous to the membrane described in Example 1. For its production N,N'-dimethylformamide is used as a solvent, benzimidazole as a catalyst of thermal imidization, reagents for chemical imidization-hinoline and anhydride of acetic acid, as a depositor-water is used, the membrane is impregnated with 40% solution of oil PMS-700 in hexane.

Example 19

Thermally, heat and chemically stable polyimide ultrafiltration membrane, analogous to the membrane described in Example 1. For its production N,N'-dimethylformamide is used as a solvent, benzimidazole as a catalyst of thermal imidization, reagents for chemical imidization-hinoline and anhydride of acetic acid, as a depositor there is used 40% aqueous solution of ethyl alcohol, the membrane is impregnated with 40% solution of oil PMS-100 in hexane.

Example 20

Thermally, heat and chemically stable polyimide ultrafiltration membrane, analogous to the membrane described in Example 1. For its production N,N'-dimethylformamide is used as a solvent, 15% solution in it of polyamidoacid, a catalyst of thermal imidization-benzimidazole 1.5 mol per 1 monomeric link of polyamidoacid, reagents for chemical imidization-tributhylamine and anhydride of acetic acid 0.4 mol per 1 monomeric link, as a depositor there is used 40% aqueous solution of ethyl alcohol, the membrane is impregnated with 40% solution of oil PMS-100 in hexane.

Example 21

Thermally, heat and chemically stable polyimide ultrafiltration membrane, analogous to the membrane described in Example 1, thickness of substrate 250 mcm.

Example 22

Thermally, heat and chemically stable polyimide ultrafiltration membrane, analogous to the membrane described in Example 4, thickness of substrate 250 mcm With multiple repetition of examples 1-22, good reproducibility of structural characteristics and properties of the membranes was observed.

The realization of this invention is not limited to the given examples.

The data presented in examples 1-22 confirm that with the present original method thermally, heat stable ultrafiltration polyimide ultraporous membranes are obtained, whole chemical characteristics are determined by high values, that are present in insoluble polyimides, from which they are made (over 400° C.). The claimed membranes are chemically stable in oppressive media, organic solvents. The claimed membranes can be used in accordance with their measured characteristics of permeability as ultrafiltration membranes.

The use of parameters, which are outside of the given range, makes the present invention not realizable.

It will be understood that each of the elements described above, or two or more together, may also find a useful application in other types of substances and methods differing from the type described above.

While the invention has been illustrated and described as embodied in thermally, heat and chemically stable ultrafiltration polyimide membrane and method of its production, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing a thermally, heat and chemically stable asymmetric ultrafiltration polyimide membrane with water permeability (Q) from $Q=80*10^{-4}$ cm/sec atm to $Q=320*10^{-4}$ cm/sec atm, comprising the steps of preparing a 10-15% forming solution of (co)polyimidoacid based on dianhydride of aromatic tetracarbonic acid and aromatic diamine in amide solution, introducing in the prepared solution of (co)polyamidoacid, a catalyst of thermal imidization-azole in the quantity of 1.5-2.5 mol per 1 monomeric link of (co)polyamidoacid, and then successively with mixing, introducing reagents: tertiary amine and anhydride of lower monocarbonic aliphatic and aromatic acids in the quantity of 0.4-1.0 mol per 1 monomeric link of (co)polyamidoacid, and during this performing a partial controlled chemical imidization of (co)polyamidoacid of 10-40%, mixing and degassing the solution of produced (co)polyimidoamidoacid, and after this performing a wet formation of the membranes by casting of a layer of forming solution of polyimidoamidoacid by a die with a regulated gap on a forming plate, immersing the plate into a deposition bath with an aqueous solution containing up to 60% of aliphatic one-atom alcohol, retaining the formed membrane in at least 20-60% solution of a high boiling oil in organic solvent for filling pores of the membrane with oil, drying the membrane and heating to 160-200° C. with the speed of temperature elevation 10°/min for obtaining complete imidization of (co)polyimidoamidoacid.

2. A method as defined in claim 1, further comprising using (co)polyamidoacid based on dianhydride of aromatic tetracarbonic acid selected from the group consisting of dianhydride of pyromellitic acid, dianhydride of 3,3',4,4'-diphenyl tetra carbonic acid, dianhydride of 3,3',4,4'-diphenyl oxytetra carbonic acid, dianhydride of 3,3',4,4' of diphenylsulfone tetra carbonic acid, dianhydride of 3,3',4,4'-benzophenone tetra carbonic acid or mixtures thereof, and aromatic diamine from the group of 4,4'-diaminodiphenyl ether, 4,4',diaminodiphenylsulfone, 4,4'-diaminodiphenylmethane, n-phenyldiamine, m-phenyldiamine, benzidine, 2,4-diaminopyrimidine, or mixtures thereof.

3. A method as defined in claim 1, further comprising using an amide solvent selected from the group consisting of N,N'-dimethylformamide, N,N'-dimethylacetamide, and N-methyl-2-pyrrolidone.

4. A method as defined in claim 1, further comprising using as the imidization azole, a substance selected from the group consisting of benzimidazole, imidazole, and 1,2,3-benzotriazole.

5. A method as defined in claim 1, further comprising using as the tertiary amine a nitrogen-containing heterocycle selected from the group consisting of pyridine, 2-picoline, 3-picoline, 2,4-lutidine, hinoline, and aliphatic aminetriethylamine and tributhylamine.

6. A method as defined in claim 1, further comprising using as the anhydride of lower monocarbonic aliphatic or aromatic acids a composition selected from the group consisting of anhydride of acetic acid, anhydride of propionic acid, and anhydride of benzoic acid.

7. A method as defined in claim 1, further comprising using as the aliphatic one-atom alcohol in a depositor a composition selected from the group consisting of ethyl alcohol, and isopropyl alcohol, butyl alcohol.

8. A method as defined in claim 1, further comprising using as the organic solvent in the solution of oil, a solvent selected from the group consisting of hexane, petroleum ether, and chlorofluorohydrocarbons.

9. A method as defined in claim 1, further comprising using as the forming plate a glass plate, from which the formed membrane composed of a polymeric selective layer and a polymeric substrate of the same polymer is separated itself before treating with the solution of oil.

10. A method as defined in claim 9, further comprising casting the forming solution of polyimidoamidoacid on the forming plate as a layer having a thickness 0.1-0.5 mm by means of a die with a regulatable gap.

11. A method as defined in claim 1, further comprising using as the forming plate a plate from a microporous metal with thickness 50-250 mcm, which can be simultaneously the substrate of the membrane.

12. A method as defined in claim 1, further comprising using as the forming plate a plate from a microporous ceramics with thickness 50-250 mcm which simultaneously can be a substrate of the membrane.

* * * * *